April 2, 1963     J. K. BEADSMOORE     3,084,287
ELECTRICAL CIRCUITS PERFORMING A SWITCHING FUNCTION
Filed Nov. 12, 1959     2 Sheets-Sheet 1

INVENTOR
JOHN KEITH BEADSMORE
BY

INVENTOR
JOHN KEITH BEADSMORE

United States Patent Office 3,084,287
Patented Apr. 2, 1963

3,084,287
ELECTRICAL CIRCUITS PERFORMING A
SWITCHING FUNCTION
John Keith Beadsmoore, Seascale, Cumberland, England,
assignor to United Kingdom Atomic Energy Authority,
London, England
Filed Nov. 12, 1959, Ser. No. 852,519
Claims priority, application Great Britain Nov. 13, 1958
2 Claims. (Cl. 328—104)

This invention relates to electrical circuits performing a switching function.

Whilst many forms of electrical switching circuits exist it has been shown that there is a need for a reliable circuit operating at high speeds, for example, one operating in the order of thousands of switchings per second. It is envisaged that such a circuit would have one application in temperature measurements from a large number of thermocouple points in a nuclear reactor. With a high speed, information can be readily passed to computer type storage systems or to cathode-ray tubes for visual presentation.

The circuit of the invention for switching over a number of two-terminal points comprises a multi-electrode valve (hereinafter referred to as a "counting valve") of the kind wherein the electric current in the valve can be circulated round a ring of electrodes by suitable potentials applied at control electrodes, the electrodes in the ring being each provided with a load resistance connected at one end to the electrode and at the other end to a first output terminal common to all the load resistances, an adjustable tapping point on each load resistance, unidirectional conducting devices allowing conduction in a direction away from each tapping point to a terminal of a two-terminal point, the other terminals of the two-terminal points being connected together to a second output terminal.

An embodiment of the invention will now be described with reference to FIGS. 1 and 2 of the accompanying drawings which are circuit diagrams.

Figure 1:
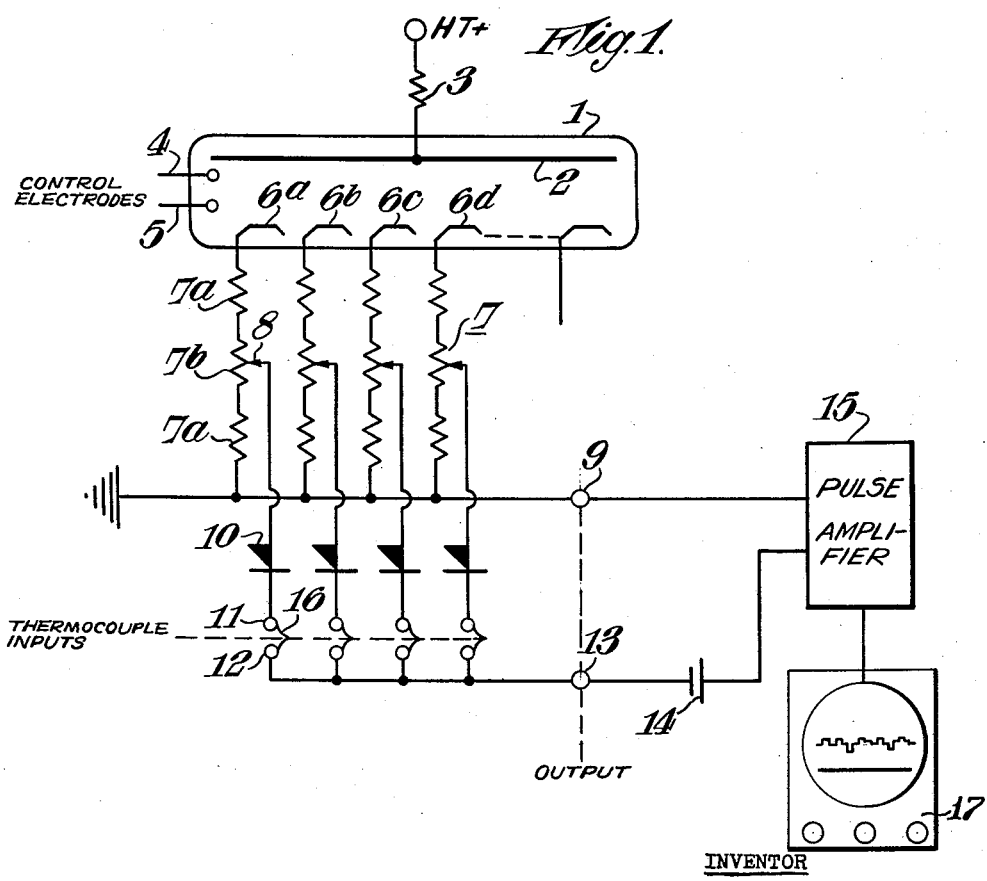

In FIG. 1, a "Dekatron" counting valve 1 has an anode 2, an anode load resistance 3, control electrodes 4, 5 and cathodes 6a, 6b, 6c, etc. Each cathode has a load resistance 7 consisting of two fixed load resistances 7a and an adjustable resistance 7b providing a tapping point 8.

The resistances 7 are connected together to an output terminal 9 which is at earth potential. From each tapping point 8 a connection is made to a diode 10 and thence to a terminal 11 which is one of a two-terminal input point, the other being terminal 12. All the terminals 12 are connected together to a second output terminal 13. At the output terminals 9, 13 there is connected any suitable voltage sensitive means to respond to voltages at said output terminals 9, 13. For slow operation of the valve 1 a simple voltmeter or potentiometric recorder could be used. For high speed operation a computor type storage system or cathode-ray tube could be used, the latter being illustrated. The voltage at the terminals 9, 13 are connected to a pulse amplifier 15 in series with a standard cell 14. The pulse amplifier is connected to feed a cathode ray tube 17.

Thermocouples 16 are shown at the two terminal points 11, 12.

In the operation of the circuit, the tapping points 8 are first adjusted. In order to do this the thermocouples are short circuited and the valve 1 is driven slowly by application of manually controlled voltage pulses at electrodes 4, 5. As the current through the valve moves over the cathodes 6a, 6b, 6c, etc. the tapping points are moved to give zero signal voltages at the output of the amplifier 15, that is, the tapping voltages are made the same as the standard cell 14 voltage. The short circuits are removed from the thermocouples and the valve is then driven electrically by the application of electronically controlled voltage pulses at electrodes 4, 5. With the current settled on cathode 6a, for example, the voltage at this cathode rises above earth potential together with the voltage at the appropriate tapping point 8. The appropriate diode 10 conducts and the tapping point voltage adds to the voltage derived from the thermocouples 16 to be presented at the output terminal 13. This voltage also appears on the "negative" side of the remainder of the diodes 10 and ensures that they cannot conduct by incidental events occurring at their associated cathodes, for example. The cell 14 also helps to ensure that no diode conducts in the absence of proper current flow through the valve to its associate cathode. Thus, it is seen that as the valve is driven so the voltages at the points 11, 12 are presented in turn at the input to the amplifier 15 and thence presented to the cathode ray tube 17.

The application of the invention can be extended to cover more than the maximum number of cathodes that can be provided by a single valve. One way of achieving this is shown in FIG. 2.

Figure 2:
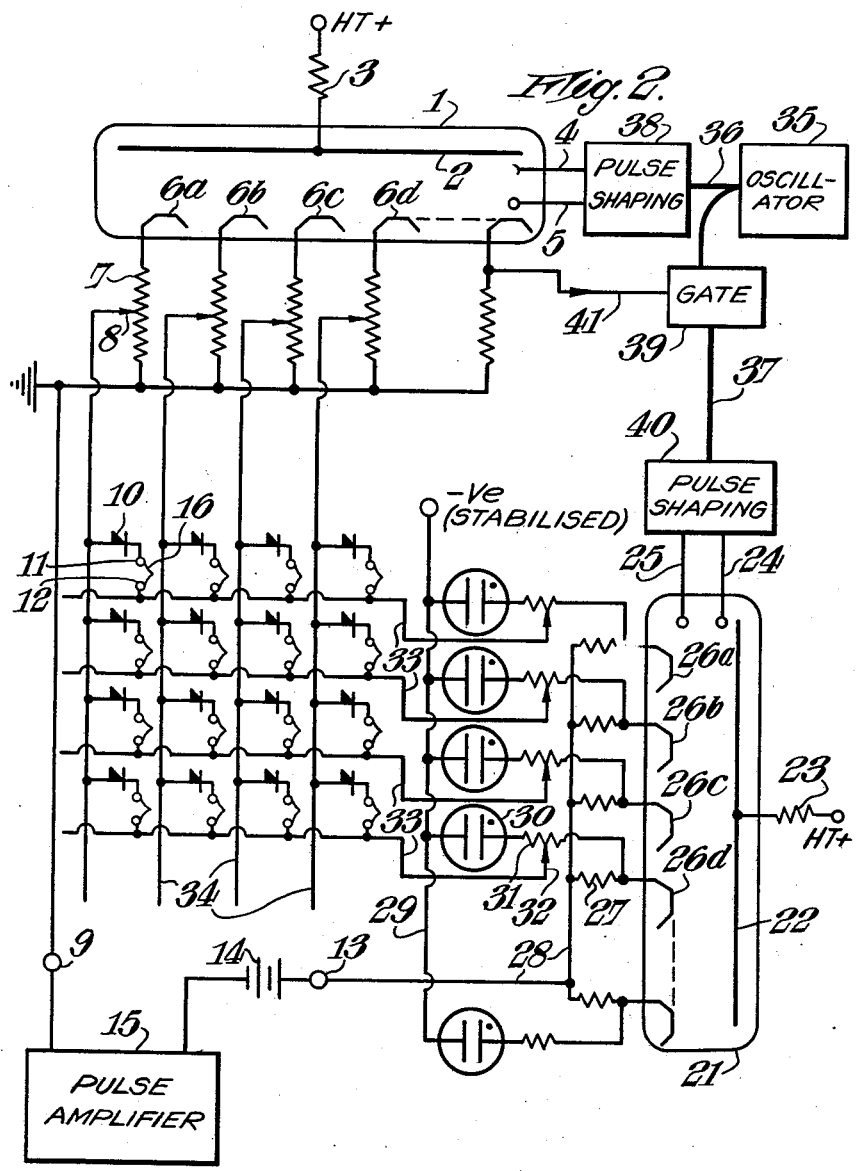

FIG. 2 is basically similar to FIG. 1 (and hence the same reference numerals are used where appropriate). FIG. 2 includes an additional "Dekatron" counting valve 21 with anode 22, load resistance 23, control electrodes 24, 25, and cathodes 26a, 26b, 26c. These cathodes are connected through their own load resistors 27 to a common line 28 connecting with the terminal 13. These cathodes are also connected to a negative stabilised line 29 via gas discharge tubes 30 and resistors 31. Tapping points 32 are taken from the resistors 31 and each point is fed to a "horizontal" cross-bar line 33. The tapping points 8 are each connected with "vertical" cross-bar lines 34 and at each intersection of the lines 33, 34 a diode 10, in series with a thermocouple 16 connected at terminals 11 and 12, is provided.

The control electrodes of valves 1 and 21 are fed from an oscillator 35 via lines 36 and 37 respectively. Line 36 includes a pulse shaping circuit 38 and line 37 includes a gate 39 and pulse shaping circuit 40. The gate is controlled to be opened by a pulse derived from the last cathode of valve 1 passing along a connection 41.

In the operation of the circuit of FIG. 2, discharge in valves 1 and 21 to cathodes 6a and 26a respectively are struck together. The voltage then appears at terminal 13 which is the sum of the voltage at tapping point 8 associated with cathode 6a, the voltage at the appropriate thermocouple 16 and the voltage of the line 28 relative to the tapping point 32 associated with cathode 26a. The pulse amplifier 15 sees this voltage sum less the voltage of the twin standard cell 14. On setting up, the tapping points 8 and 32 are each made to a potential equal to the one cell of the twin standard cell 14 and thus the amplifier 15 sees, in effect, the thermocouple voltage. The discharge in valve 1 is now struck to cathode 6b and the next thermocouple has its voltage presented to the amplifier 15, and so on, until up to one hundred thermocouples have had their voltages presented to the amplifier 15.

I claim:

1. For performing a switching function, an electrical circuit comprising a first multi-electrode valve of the kind wherein the electric current in the valve can be circulated round a ring of electrodes by control potentials applied at control electrodes, a load resistance for each electrode in the ring connected at one end to the electrode and at the other end to a first output terminal common to all the load resistances, an adjustable tapping point on each load resistance, a connector from each tapping point, a set of unidirectional conducting devices connected to each of said connectors in a conducting sense away from the connector, first input connecting terminals, a connection from each of said conducting devices to a first input connecting terminal, a second multi-electrode valve similar to the first, a load resistance for each electrode in the ring of the second valve all connected to a second output terminal, a resistor from the electrodes of the ring of the second valve to a negative stabilized line, an adjustable tapping point on each of the last mentioned resistors, connectors from each of the last mentioned tapping points, a set of second input terminals connected to each of said last mentioned connectors to form with the first input terminals a coordinate set of input terminal pairs, a pulse source for driving the first multi-electrode valve, a pulse source for driving the second multi-electrode valve, an oscillator feeding both of said pulse sources, a gate between the oscillator and the pulse source for the second multi-electrode valve and a connection from the last electrode in the ring of electrodes of the first multi-electrode valve to said gate to open it when the electric current to the first valve alights on said last electrode.

2. An electrical switching circuit comprising a plurality of pairs of signal input terminals, a single pair of signal output terminals, a coupling line common to one terminal of each pair of signal input terminals leading to one terminal of the signal output terminals, a plurality of separate control lines each leading from the second terminal of each pair of signal input terminals to the second terminal of the output terminals, a diode blocking each control line, and means to unblock each control line in sequence comprising a multi-electrode valve having an anode and a plurality of cathodes, a load resistance connected between each cathode and the second terminal of the signal output terminals, each control line including one of said load resistances and having an adjustable tapping thereon connected to the diode blocking said control line, and a source of unblocking potential connected to the anode of the multi-electrode valve which is applied to each load resistance in sequence.

References Cited in the file of this patent

UNITED STATES PATENTS

| | | |
|---|---|---|
| 2,563,589 | Den Hertog | Aug. 7, 1951 |
| 2,583,711 | Scowen | Jan. 29, 1952 |
| 2,610,243 | Burkhart et al. | Sept. 9, 1952 |
| 2,876,350 | Kuchinsky | Mar. 3, 1959 |
| 2,886,797 | Gardberg | May 12, 1959 |
| 2,919,347 | Cola | Dec. 29, 1959 |
| 2,980,861 | Popowsky | Apr. 18, 1961 |

FOREIGN PATENTS

| | | |
|---|---|---|
| 711,053 | Great Britain | June 23, 1954 |